US006835367B2

(12) United States Patent
James et al.

(10) Patent No.: US 6,835,367 B2
(45) Date of Patent: Dec. 28, 2004

(54) SINGLE STEP PROCESS FOR THE SYNTHESIS OF NANOPARTICLES OF CERAMIC OXIDE POWDERS

(75) Inventors: Jose James, Kerala (IN); Rajan Jose, Kerala (IN); Asha Mary John, Kerala (IN); Jacob Koshy, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 337 days.

(21) Appl. No.: 10/084,860

(22) Filed: Feb. 28, 2002

(65) Prior Publication Data

US 2002/0110517 A1 Aug. 15, 2002

Related U.S. Application Data

(62) Division of application No. 09/537,252, filed on Mar. 28, 2000.

(51) Int. Cl.[7] .......................... C01F 7/00; C01G 23/00; C01G 25/00; C01G 27/00
(52) U.S. Cl. ................ 423/593; 423/593.1; 423/594.1; 423/598; 423/600; 423/594.12; 423/594.16; 423/594.2
(58) Field of Search .......................... 423/593.1, 594.1, 423/598, 593, 600, 594.12, 594.16, 594.2

(56) References Cited

U.S. PATENT DOCUMENTS

| 4,058,592 A | * | 11/1977 | Quets | 423/594.2 |
| 4,778,671 A | * | 10/1988 | Wusirika | 423/592.1 |
| 5,753,026 A | * | 5/1998 | Kuntz et al. | 106/450 |
| 5,811,068 A | * | 9/1998 | Takatori et al. | 423/263 |
| 5,958,361 A | * | 9/1999 | Laine et al. | 423/610 |
| 2002/0119093 A1 | * | 8/2002 | Murayama et al. | 423/592 |

* cited by examiner

*Primary Examiner*—Ngoc-Yen Nguyen
(74) *Attorney, Agent, or Firm*—Ladas & Parry LLP (57) ABSTRACT

The present invention relates to a single step process for the synthesis of nanoparticles of phase pure ceramic oxides of a single or a multi-component system comprising one or more metal ions. The process comprises preparing a solution containing all the required metal ions in stoichiometric ratio by dissolving their respective soluble salts in an organic solvent or in water, preparing a precursor, adjusting the nitrate/ammonia content in the system, and heating the system.

11 Claims, 15 Drawing Sheets

SINGLE STEP PROCESS FOR THE SYNTHESIS OF NANOPARTICLES OF CERAMIC OXIDE POWDERS

This is a divisional of application Ser. No. 09/537,252, filed Mar. 28, 2000.

FIELD OF THE INVENTION

The present invention relates to a single step process for the synthesis of nanoparticles of ceramic oxide powders. More particularly, the present invention relates to a single step process for the synthesis of ceramic oxide powders using aqueous and non-aqueous precursors.

BACKGROUND OF THE INVENTION

Synthesis of nanoparticle ceramic powder is one of the major challenges for the development of advanced ceramics and specialty materials. The most important requirements for the powders of these materials are the availability of uniform nano-sized particles of well defined characteristics without agglomeration and controlled surface properties. Therefore, in recent years the processing of ultrafine, nanoparticles has gained tremendous importance [Chirino A. M. and Sproule R. T., American Ceramic Society Bulletin, Vol.59 (1980), pp.604; Gleiter, Nanostructured Materials, Vol.1 (1992), pp. 1; R. A. Andrievski, Journal of Materials Science, Vol.29 (1994), pp.614]. Nano sized particles, because of their high surface energy and driving force can be densified at much lower temperatures (by several hundreds of degrees) as compared to the large grained powders [W. H. Rhodes, Journal of American Ceramic Society, Vol.64 (1981), pp.19; J. R. Groza and R. J. Downing, Nanostructured Materials, Vol.7 (1981), pp. 749]. The final product will thus preserve the initial grain size of the powder and exhibit unique mechanical, optical, magnetic and electrical properties [M. S. Haji Mahmmod and L. S. Chumbley, Nanostructured Materials, Vol.7 (1996), pp.95; S. W. Mahon, R. F. Cochrane and M. A. Howson, Nanostructured Materials, Vol. 7 (1996), pp.195; C. Suryanarayana, Bulletin of Material Science, Vol.17 (1994), pp.307].

For the synthesis of oxide ceramic materials, chemical methods such as co-precipitation [R. Y. Bratto, American Ceramic Society Bulletin, Vol.48 (1969), pp.739], sol-gel technique [G. I. Missing and M. Kumagai, Journal of American Ceramic Society, Vol. 72(1989), pp.40] spray drying [J. G. Delau, American Ceramic Society Bulletin, Vol.49 (1970), pp.572] and freeze drying [Z. N. Nakagawa et al., Yogyo Kyokuishi 90 (1970) 313] are employed. In the case of co-precipitation methods it is very difficult to obtain homogeneous powders because in multi-component systems, various components precipitate at different pH values. In addition, the precipitate obtained needs calcination at elevated temperatures for getting useful powders. Sol-gel is a multiple step operation which involves calcination for prolonged duration at high temperatures for obtaining powders and processing of high volume off liquids with relatively low yield.

Recently, another processing technique, termed as self-sustained combustion or combustion synthesis, has been used to synthesis fine ceramic powders. This process of combustion synthesis involves rapid decomposition of a saturated aqueous solution, containing metal salts [J. J. Kingsley et al., J. Mater. Sci. 25 (1990) 1305; A. Pathak et al. Nanostructured Materials 8 (1997) 101; S. K. Saha et al. Nanostructured Materials 8 (1997) 29; Raveendranathan and Patil, K. C., J. Am. Ceram. Soc. Bull. 66 (1987) 688]. In the urea-nitrate method proposed by Patil et al the metal nitrate salts and urea are dissolved in minimum quantity of water and the solution was evaporated and burnt. For obtaining the required powder it was necessary to introduce the above solution to a preheated furnace (~500° C.). In the hydrazine complex precursor route [Raveendranathan and Patil, K. C., J. Am. Ceram. Soc. Bull. 66 (1987) 688], the crystalline precursor complex is prepared from a solution containing metal salts and the appropriate hydrazine derivative salt. The cleaned precursor crystals thus obtained are burnt in air to get the required oxide powders. The above procedure is complex and involves less common reagents. The experimental procedure is also reported to be hazardous if not properly handled or controlled [K. C. Patil, Bull. Mater. Sci. 16 (1993) 588]. In another method for the preparation of fine oxide powders Pramanik et al. [S. K. Saha et al. Nanostructured Materials 8 (1997) 29] have used a solution containing metal nitrates, urea (or Tri Ethyl Ammonium Carbonate) and Poly Vinyl Alcohol. In this method, to get phase pure powder of the material, it was essential to calcine the precursor at high temperatures (~900° C.) for prolonged duration. Al these methods of self sustained combustion are limited to preparation of those compounds which have water soluble (aqueous) metal salts. Ceramic compounds having metals whose salts are mostly water insoluble (non-aqueous), like silicon containing compounds, cannot be prepared using the above reported methods.

OBJECTS OF THE INVENTION

The main object of the invention is to develop a process for the synthesis of nanoparticle ceramic oxide powders using metal salts that are even insoluble in water.

Another object of the invention is to provide a versatile process for the synthesis of nanoparticle ceramic oxide powders.

Another object of the invention is to synthesise compounds that are single component, two component or even multi-component systems.

Yet another object of the invention is to use a solvent which dissolves all the metal salts required for the preparation of a particular ceramic oxide.

Yet another object of the invention is to provide a process for the syntehsis of nanoparticle ceramic oxide powders without requiring the step of calcination.

It is a further object of the invention to provide a process for the synthesis of nanoparticle ceramic oxide powders without the step of calcination to obtain phase pure ultrafine powder is obtained at relatively low temperatures (~300° C.) using a sand bath/hot plate.

Yet another object of the invention is to obtain any desired single phase ceramic oxide including complex systems in nanoparticulate form.

Another object of the invention is to provide a process for the synthesis of nanoparticle ceramic oxide powders that obviates the disadvantages associated with the prior art processes.

SUMMARY OF THE INVENTION

Accordingly, the present invention relates to a single step process for the synthesis of nanoparticles of phase pure ceramic oxides of a single or a multi-component system comprising one or more metal ions, said process comprising,
(a) preparing a solution containing all the required metal ions in stoichiometric ratio by dissolving their respective soluble salts in an organic solvent or in water,
(b) preparing a precursor by complexing the metal ions with a complexing agent while keeping the ratio of the charges of the acid to the charges of the metal ions as unity;
(c) adjusting the nitrate/ammonia content in the system;
(d) heating the system from room temperature to 250–300° C.

In one embodiment of the invention, the desired oxide contains (a) one cation selected from the group comprising of $Al_2O_3$, $ZrO_2$, $TiO_2$, $CeO_2$, $HfO_2$, $MgO$, $SiO_2$, (b) two cations of the general formula $ABO_3$, wherein A is Si, Al, Y or Lanthanides, B is Ba, Sr, Ca, Mg or Fe; with general formula $AlM_2O_5$, where M=Ti, Zr or Hf; or with general formula $Al_2NO_4$, where N=Mg, Ca, Sr, Ba, Zn, (c) three cations with the general formula $A(B_{0.5}B'_{0.5})O_6$ or $A_2(BB')O_6$, where A is Ba, Sr, Ca or Mg, B is Zr, Hf, Sb or Sn, B' is Al, Y or Lanthanides, (d) four cations with general formula $(AA')(BB')O_6$, where A and A' are Ba, Sr, Ca or Mg, B is Zr, Hf, Sb or Sn, B' is Al, Y or Lanthanides.

In another embodiment of the invention, the complexing agent is selected from the group comprising of citric acid, EDTA and oxalic acid.

In another embodiment of the invention, the nitrate/ammonia content in the system is adjusted by addition of ammonium nitrate where the precursor is formed in an organic solvent.

In yet another embodiment of the invention, the nitrate/ammonia content in the system is adjusted by the addition of nitric acid and ammonia or ammonium nitrate where the precursor complex is formed in water.

In another embodiment of the invention, water insoluble metal salts are brought into solution by dissolving them in an organic solvent.

In another embodiment of the invention, the metal salts are selected from the group comprising of alkoxides, nitrates, chlorides, sulphates, oxychlorides or any other salts that are soluble in an organic solvent.

In a further embodiment of the invention, the water insoluble oxides and carbonates of the desired metal are dissolved in suitable acids prior to use.

In yet another embodiment of the invention, any metal that can be dissolved to form a solution can be used for making their oxides.

In yet another embodiment of the invention, the organic solvent is selected from the group comprising of alcohols, trichloroethylene, and any other solvent capable of dissolving the complexing agent and any one of the metal salts needed to form the desired oxide.

In a further embodiment of the invention, the organic solvent is selected from the group comprising of ethyl alcohol, methyl alcohol and isopropyl alcohol.

In yet another embodiment of the invention, the combustion is self-ignited and propagated when heated.

In a further embodiment of the invention, the heating is done on a sand bath/hot plate.

DETAILED DESCRIPTION OF THE INVENTION

The present invention provides a new one-step process for the synthesis of nanoparticulate oxide ceramics at low temperature using only a sand bath/hot plate. The details of the procedure for the synthesis of ultra fine ceramic oxide powder comprises of, (1) Preparation of-the solution of all the metal salts in the same solvent and mixing them in required ratios.
(2) Addition of required quantity of an organic complexing agent like Citric acid or Ethylin Diamine Tetra Acetic acid (EDTA) to the solution.
(3) Adjusting the nitrate/ammonia content in the system
(4) Heating the solution on a sand bath/hot plate The salts of metals may be selected from its alkoxides, oxides, nitrates, oxychlorides, carbonates or anything, which could be dissolved in the same solvent. The ammonia/nitrate content is adjusted by addition of the appropriate reagents. Ammonia/nitrate could be added as $(NH_4)^+/NO_3$ or any of their derivatives depending on the system selected. The oxide powders obtained by this method are characterised by X-ray diffraction, FT-IR, TEM and particle size analysis.

The solvent used may be ethyl alcohol, methyl alcohol, isopropyl alcohol, trichloroethylene, water etc.

The details of the invention is described in the examples given below which are provided by way of illustration only and should not be construed to limit the scope of the invention.

EXAMPLE 1

Synthesis of Nanoparticles of $SiO_2$

Tetraethylorthosilicate (2 ml) and citric acid (3.343 g) were dissolved in ethyl alcohol (20 ml) in a glass beaker. To this solution sufficient quantity of ammonium nitrate was added to adjust the ammonia/nitrate content in the system. The beaker containing the solution was heated in a hot plate. Initially the solution boils and undergoes dehydration followed by decomposition leading to smooth deflation with enormous swelling, producing a foam. The foam then ignites and the product of combustion is voluminous and fluffy ultra fine powder of $SiO_2$.

Figure 1A:
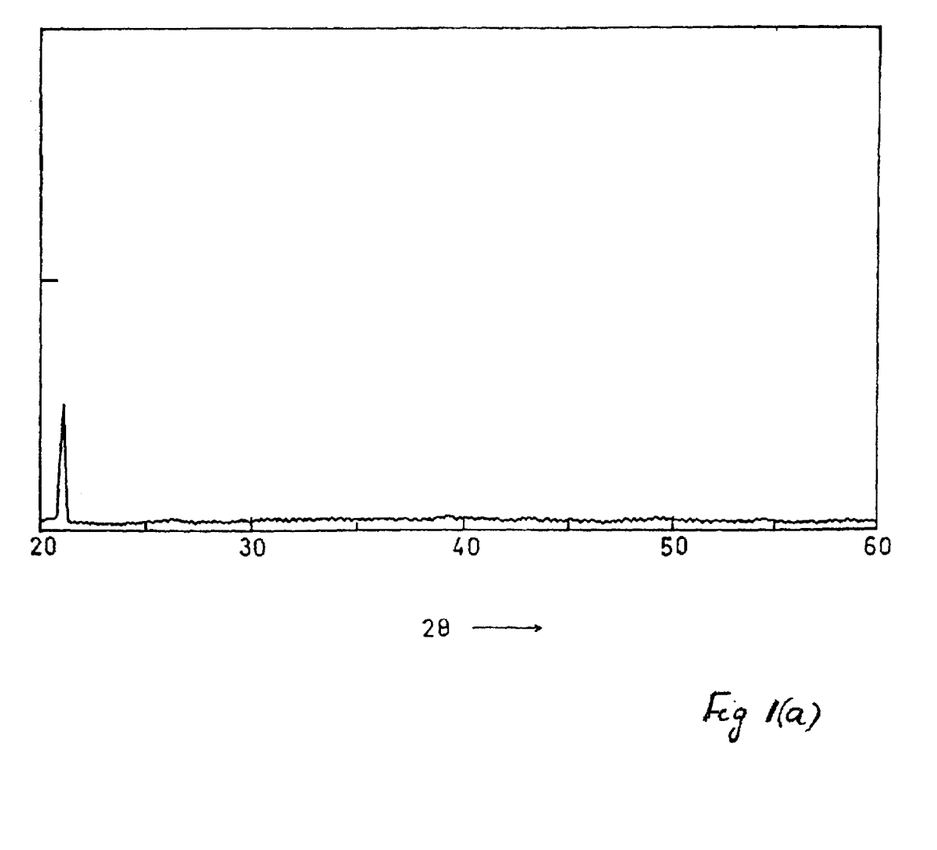
FIG. 1(a) gives the X-ray diffraction patterns of the precursor of the ceramic oxides prepared by the process of the present invention confirming that the powder obtained is pure $SiO_2$.
Figure 1B:
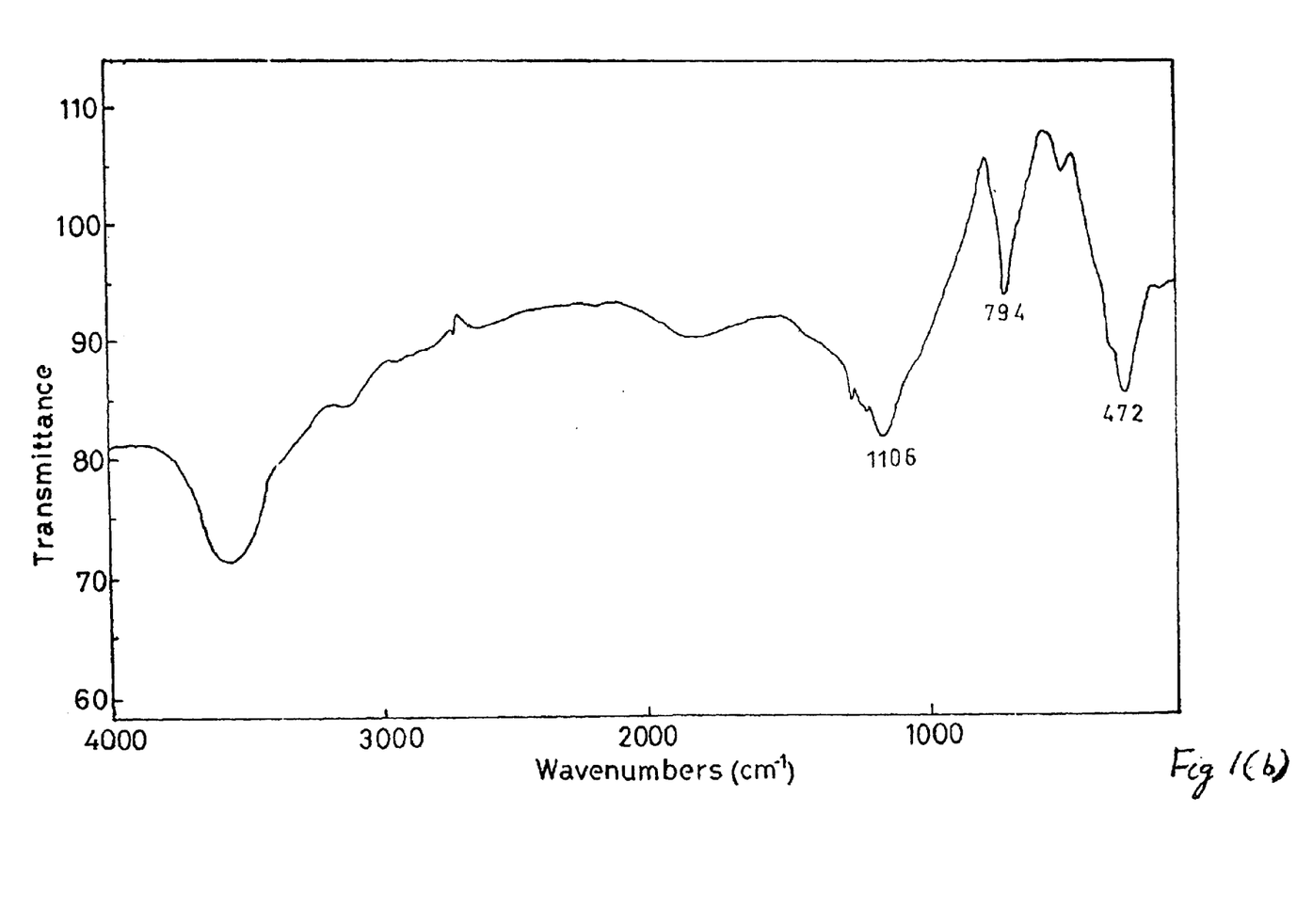
FIG. 1(b) gives the FT-IR spectrum of the precursors confirming that combustion is complete and that no organic matter is present in the system.

The X-ray diffraction patterns of the precursor is given in figure (a) which confirms that the powder obtained is phase pure $SiO_2$. The FT-IR spectrum shown in FIG. 1(b) confirms that the combustion is complete and no organic matter is present in the system. The TEM examination of the powders give the particle sizes in the range of 50–400 m. The particle size analysis of the samples has shown that more than 505 of the particles/agglomerates have size less than 900 nm which corroborates the TEM results.

EXAMPLE 2

Synthesis of Ultrafine Particles of $Al_2O_3$

Aluminium nitrate (10 g) and EDTA (5.84 g) were dissolved in 25 ml of water in separate glass beakers. They were then mixed together and the nitrate ammonia content were adjusted by the addition of nitric acid/ammonium hydroxide. The beaker containing the solution is heated in a sand bath. Initially the solution boils and undergoes dehydration followed by decomposition leading to smooth , deflation with enormous swelling, producing a foam. The foam then ignites and propagates by itself and the product of combustion is voluminous and fluffy ultra fine powder of alumina (Alumina-I).

The same procedure as above was carried out with ethanol as solvent and adjusting the Nitrate/ammonia content using ammonium nitrate. The sample is labelled as Alumina-II.

Figure 2A:
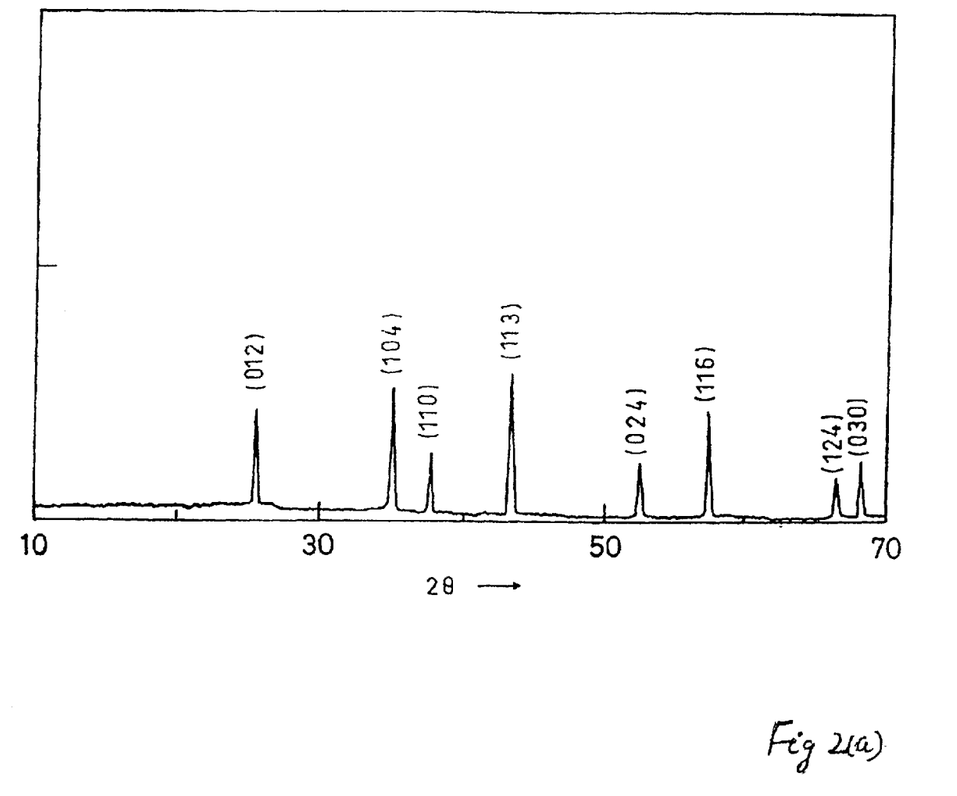
FIG. 2(a) gives the X-ray diffraction patterns of precursor powders (both Alumina I and Alumina II) heated at 900° C. for 2 hours showing that the alumina is still amorphous.
Figure 2B:
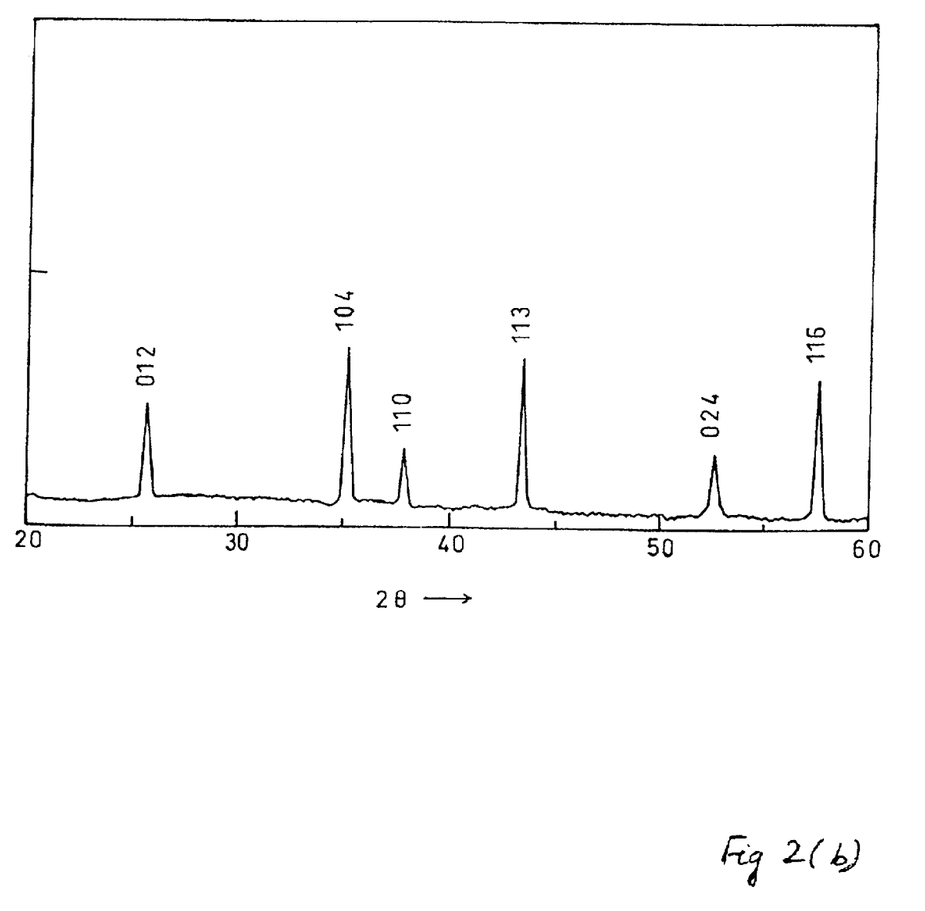
FIG. 2(b) gives the X-ray diffraction patterns of both precursor powders Alumina I and Alumina II heated at 1100° C. for 4 hours confirming that the powder is phase pure.
Figure 2C:
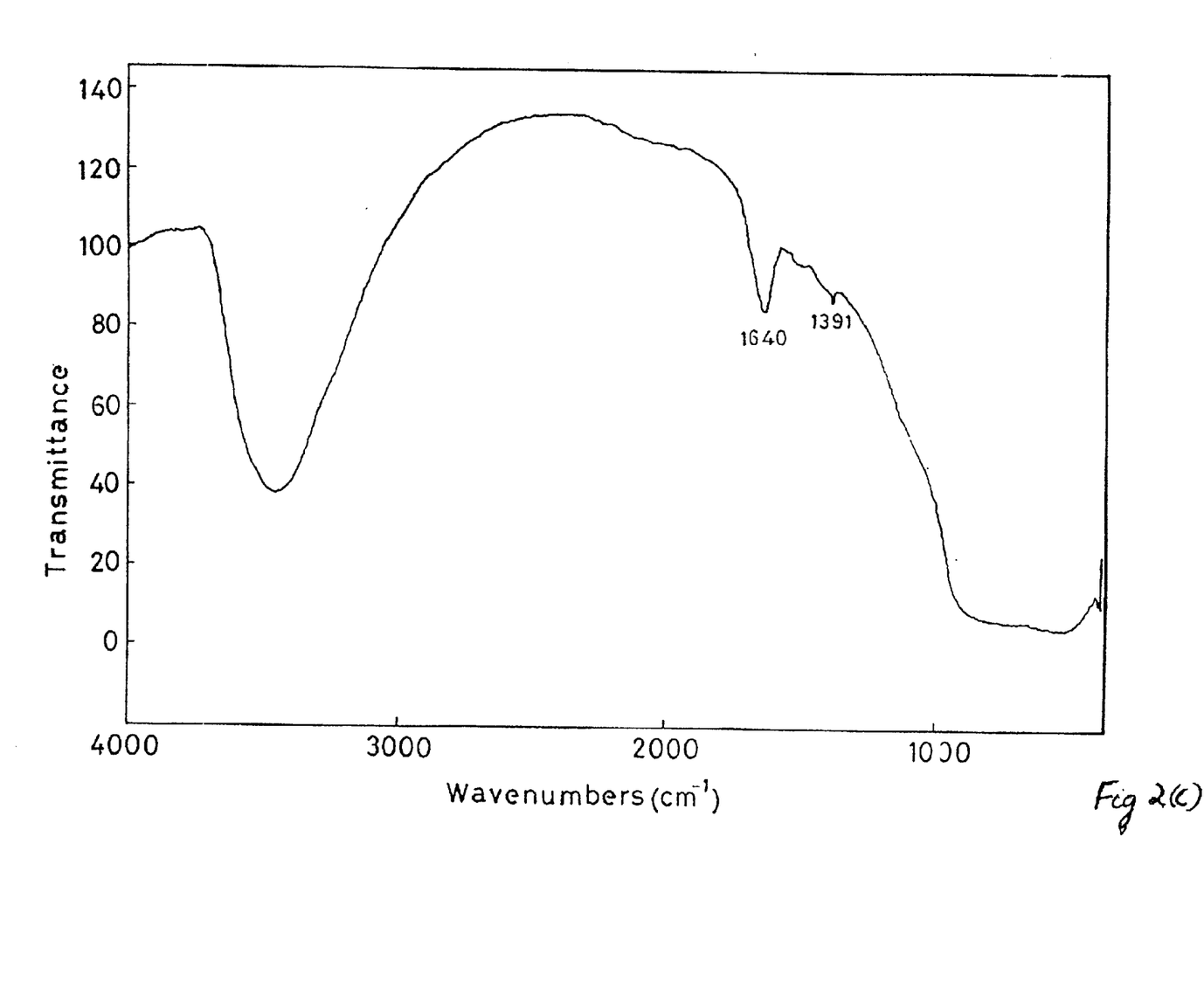
FIG. 2(c) is the FT-IR spectrum of both precursor powders Alumina I and Alumina II confirming that combustion is complete and that no organic matter is present in the system.

The direct products after combustion was amorphous but crystallised into hexagonal structure at about 1100° C. The X-ray diffraction patterns of the precursor powders (both Alumina-I and Alumina-II) heated at 900° C. for 2 hours has shown that alumina is still amorphous and those heated at 1100° C. for 4 hours, shown in FIGS. 2(a&b) confirms that the powder obtained is phase pure. The FT-IR spectrum shown in FIG. 2(c) confirms that the combustion is complete and no organic matter is present in the system. The TEM examination of the powders give the particle sizes in the range of 50–400 nm. The particle size analysis of the samples has shown that more than 50% of the particles/agglomerates have size less than 800 nm which corroborates the TEM results.

EXAMPLE 3

Synthesis of Ultrafine Particles of Calcium Silicates

Stoichiometric amounts of calcium nitrate (6.345 g) and Tetraethyl orthosilicate (3 ml) and citric acid (7.5292 g) were dissolved in ethyl alcohol (50 ml). To this solution sufficient quantity of ammonium nitrate was added to adjust the ammonia/nitrate content in the system. The beaker containing the solution was heated in a hot plate. Initially the solution boils and undergoes dehydration followed by decomposition leading to smooth deflation with enormous swelling, producing a foam. The foam then ignites and the product of combustion is voluminous and fluffy ultrafine powder of calcium silicates. Depending on the amount of calcium nitrate used we can get monocalcium silicate ($CaSiO_3$), dicalcium silicate ($Ca_2SiO_4$) or tricalcium silicate ($Ca_3SiO_5$).

Figure 3A:
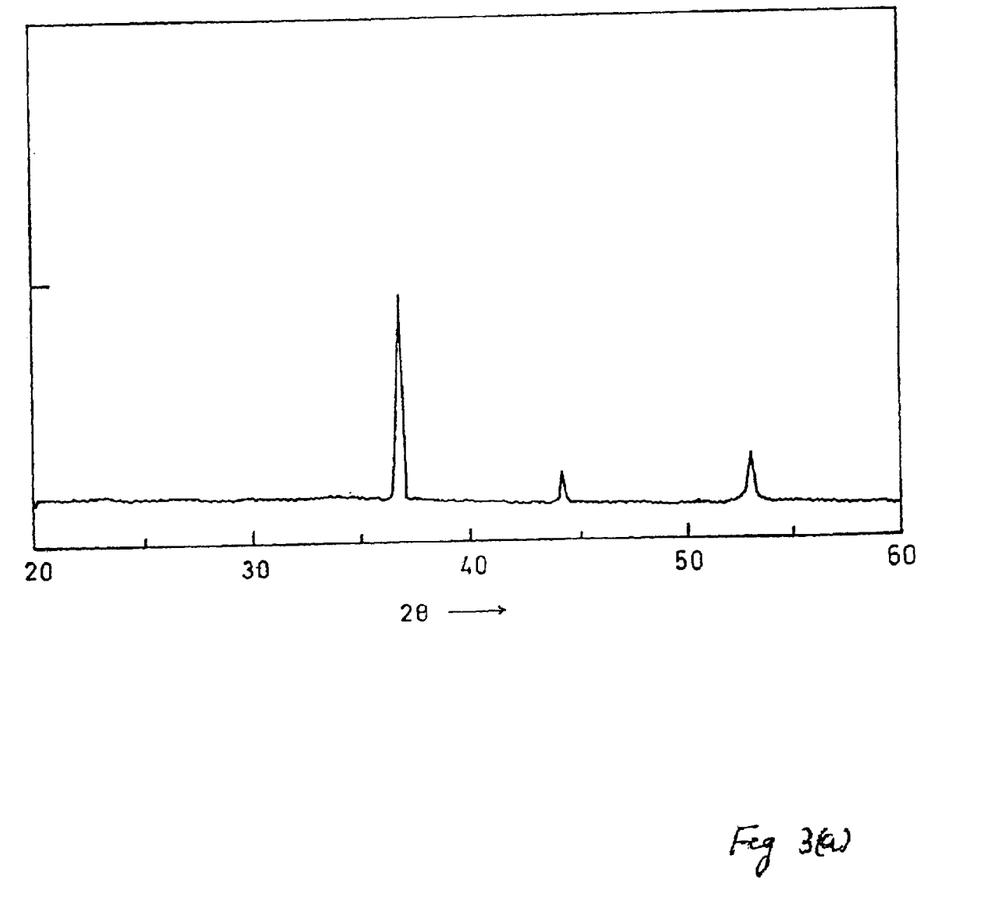
FIG. 3(a) gives the X-ray diffraction patterns of a precursor confirming that the powder obtained is phase pure $CaSiO_3$.
Figure 3B:
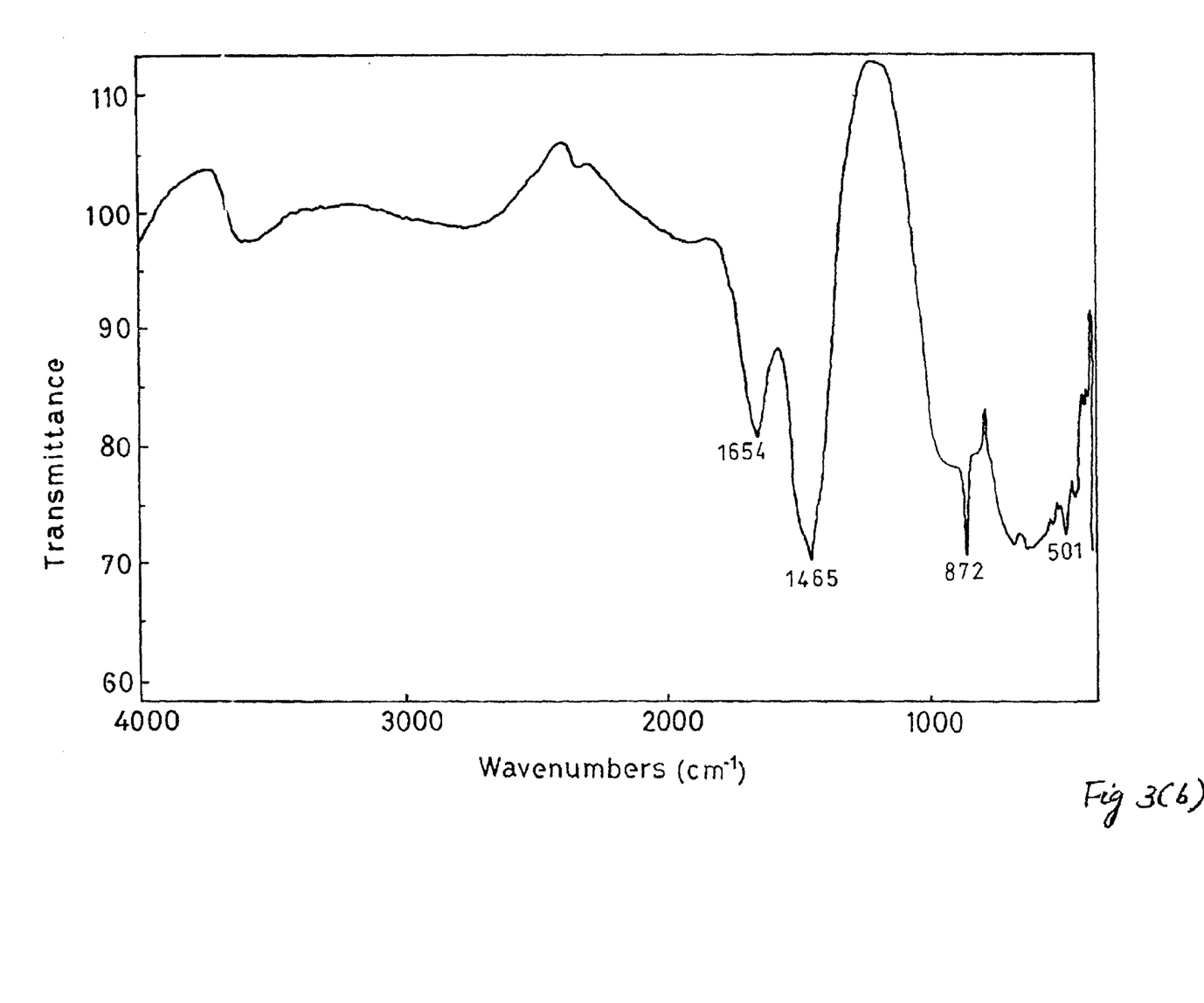
FIG. 3(b) gives the FT-IR spectrum corresponding to precursor of X-ray diffraction shown in FIG. 3(a) and shows that combustion is complete and that no organic material is present in the system.

The X-ray diffraction patterns of the precursor is given in FIG. 3(a) which confirms that the powder obtained is phase pure CaSiO3. The FT-IR spectrum shown in FIG. 3(b) confirms that the combustion is complete and no organic matter is present in the system. The TEM examination of the powders give the particle sizes in the range of 50–40 nm. The particle size analysis of the samples has shown that more than 50% of the particles/agglomerates have size less than 850 nm which corroborates the TEM results.

EXAMPLE 4

Synthesis of Nanoparticulate $BaZrO_3$

Analytical grade $Ba(NO_3)_2.5H_2O$ (1.233 g) and $ZrOCl_2.8H_2O$ (1 g) were dissolved in distilled water. They were then mixed in a glass beaker so as to get the desired stoichiometry. To this mixture, appropriate amount of citric acid (1.3047 g) was added and the nitrate/ammonia content was controlled by the addition of nitric acid and ammonium hydroxide. The beaker containing the solution is heated in a sand bath. Initially the solution boils and undergoes dehydration followed by decomposition leading to smooth deflation with enormous swelling, producing a foam. The foam then ignites and the product of combustion is voluminous and fluffy ultrafine powder of $BaZrO_3$.

Figure 4A:
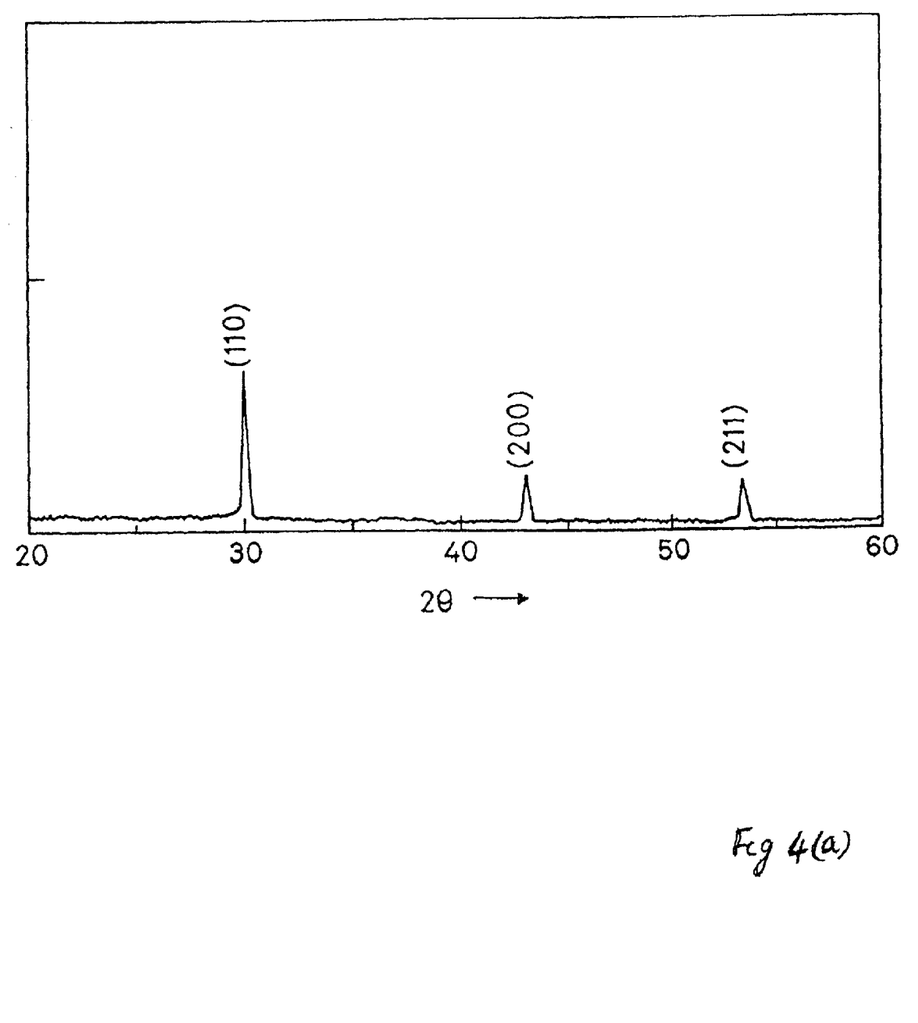
FIG. 4(a) gives the X-ray diffraction pattern for the precursor powder $BaZrO_3$ confirming that the powder is phase pure.
Figure 4B:
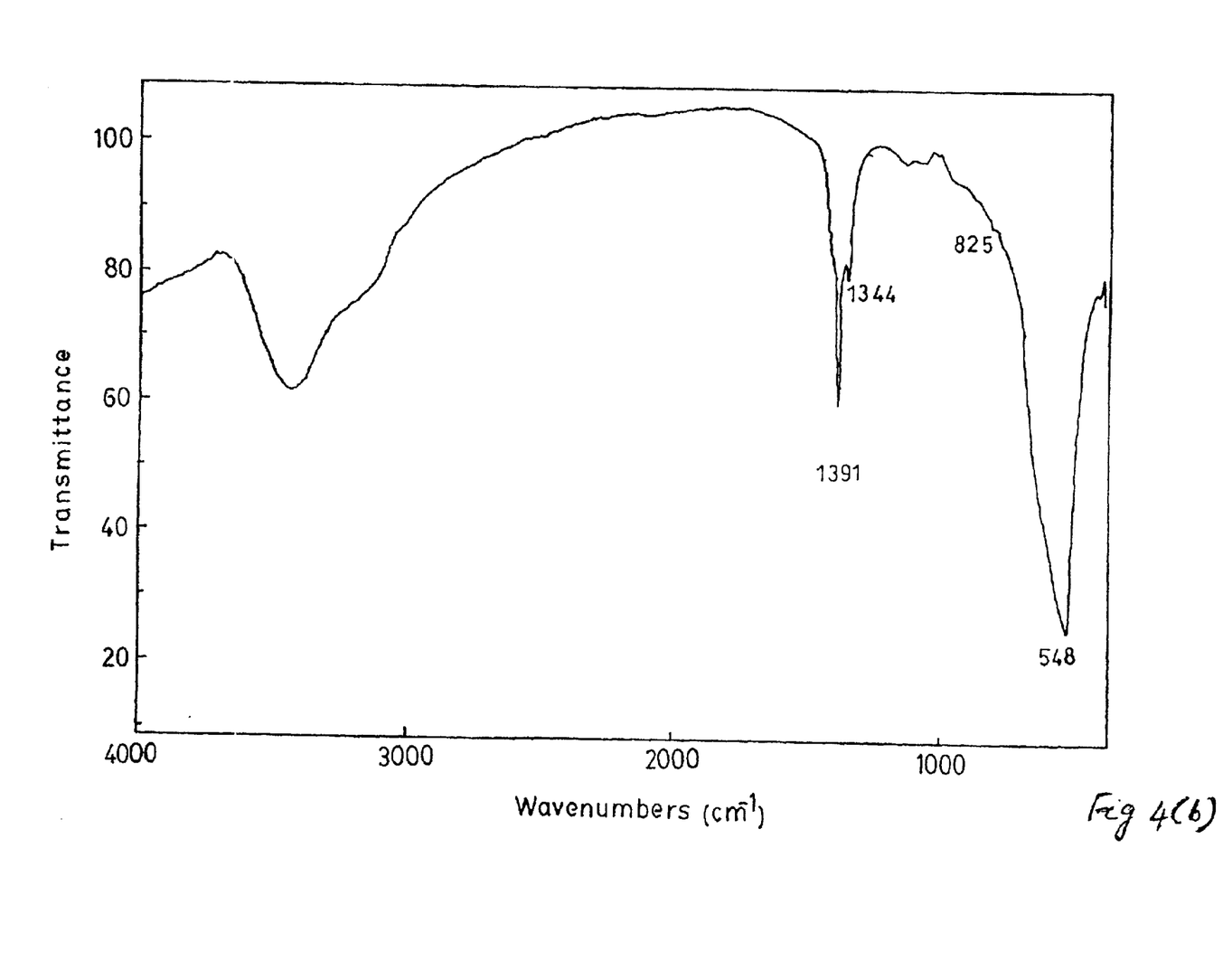
FIG. 4(b) gives the corresponding FT-IR spectrum for $BaZrO_3$ showing that combustion is complete and that no organic matter is present in the system.

The X-ray diffraction patterns of the precursor is given in FIG. 4(a) which confirms that the powder obtained is phase pure. The FT-IR spectrum shown in FIG. 4(b) confirms that the combustion is complete and no organic matter is present in the system. The TEM examination of the powders give the particle sizes in the range of 50–400 nm. The particle size analysis of the samples has shown that more than 55% of the particle/agglomerates have size less than 800 nm which corroborates the TEM results.

EXAMPLE 5

Synthesis of Ultrafine Particles of $AlBa_2ZrO_{5.5}$

Stoichiometric amounts of $Al(NO_3)_3.9H_2O$, $ZrO(NO_3)_2.8H_2O$ and citric acid were dissolved in ethyl alcohol and $Ba(NO_3)_2.5H_2O$ in water in a glass beaker. In typical experiment 11.641 g of $Al(NO_3)_3.9H_2O$, 10 g of $ZrO(NO_3)_2.8H_2O$ and 23.912 g of citric acid were dissolved in 25 ml of ethanol and 12.248 g of $Ba(NO_3)_2.5H_2O$ in water each in separate glass beakers. The nitrate/ammonia content in the solution was adjusted by the addition of ammonium nitrate. The stoichiometry of the redox mixture was calculated from the total valency of the oxidising and reducing agents. The beaker containing the solution was heated in a hot plate. Initially the solution boils and undergoes dehydration followed by decomposition leading to smooth deflation with enormous swelling, producing a foam. The foam then ignites and the product of combustion is voluminous and fluffy ultrafine powder of aluminium Barium Zirconate.

Figure 5A:
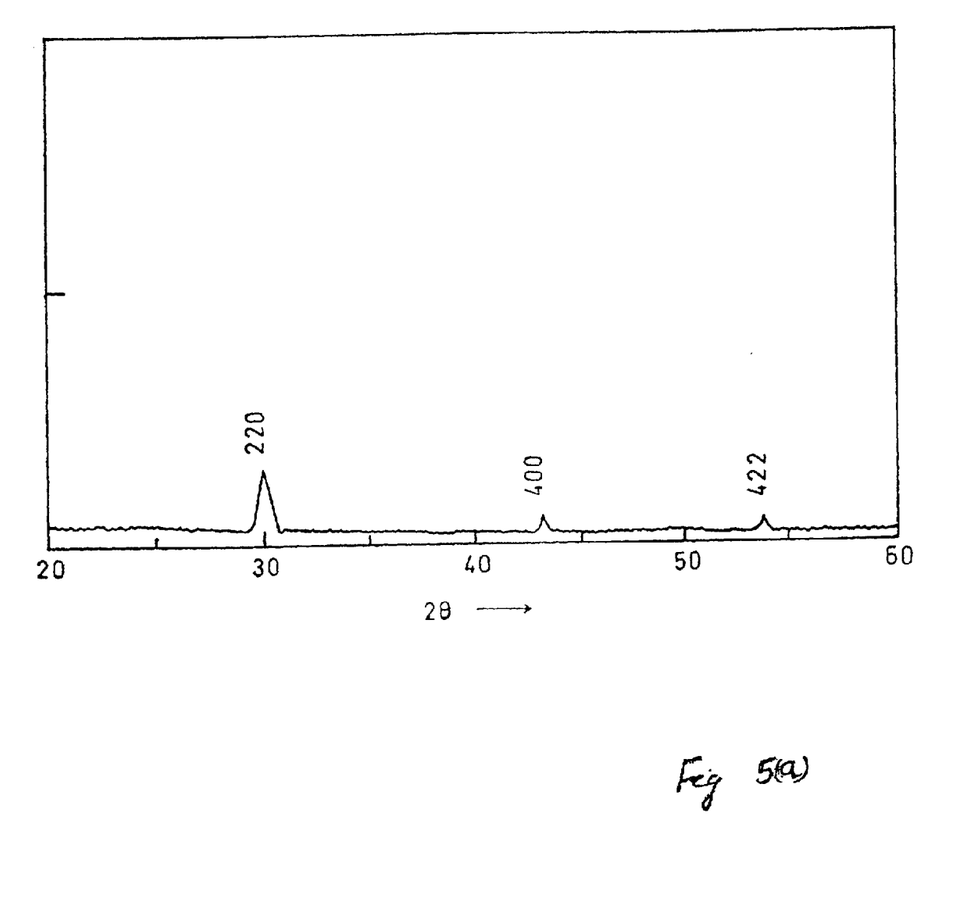
FIG. 5(a) is the X ray diffraction pattern for the precursor Aluminium Barium Zirconate showing that the powder obtained is phase pure.
Figure 5B:
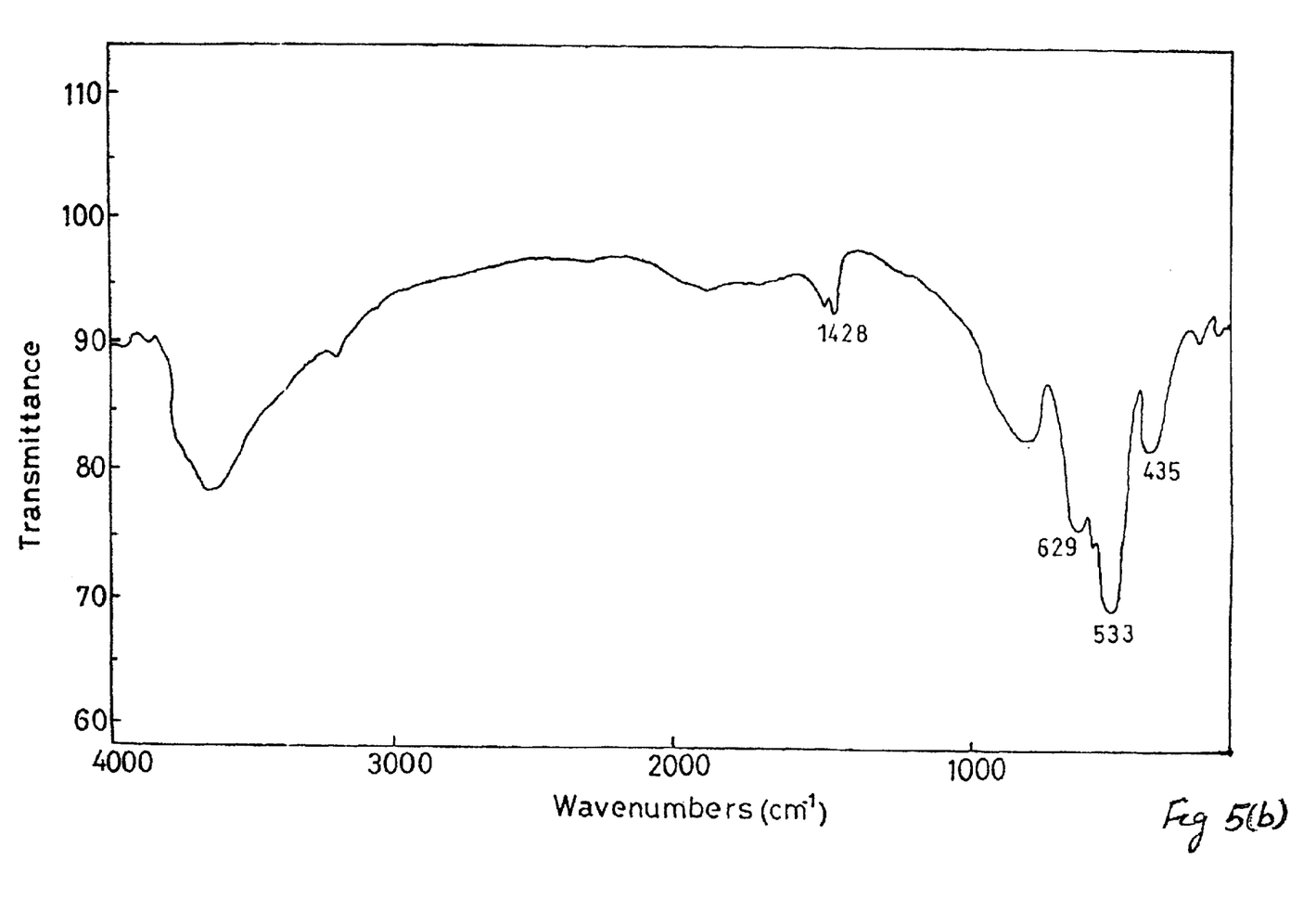
FIG. 5(b) gives the FT-IR spectrum for the precursor Aluminium Barium Zirconate confirming that combustion is complete and that no organic matter is present in the system.

The X-ray diffraction patterns of the precursor is given in FIG. 5(a) which confirms that the powder obtained is phase pure. The FT-IR spectrum shown in FIG. 5(b) confirms that the combustion is complete and no organic matter is present in the system. The TEM examination of the powders give the particle sizes in the range 50–400 nm. The particle size analysis of the samples has shown that more than 50% of the particles/agglomerates have size less than 800 nm which corroborates the TEM results.

EXAMPLE 6

Synthesis of Nanoparticulate $YBa_2ZrO_{5.5}$

Analytical grade $Y_2O_3$ (1.725 g) and $BaCO_3$ (6.127 g)were dissolved in nitric acid and $ZrOCl_{2.8}H_2O$ (5 g) in distilled water. They were then mixed in a glass beaker so as to get the desired stoichiometry. To this mixture appropriate amount of citric acid (10.935 g) was added and the nitrate/ammonium content was controlled by the addition of nitric acid and ammonium hydroxide. The beaker containing the solution is heated in a sand bath. Initially the solution boils and undergoes dehydration followed by decomposition leading to smooth deflation with enormous swelling, producing a foam. The foam then ignites and the product of combustion is voluminous and fluffy ultrafine powder of $YBa_2ZrO_{5.5}$.

Figure 6A:
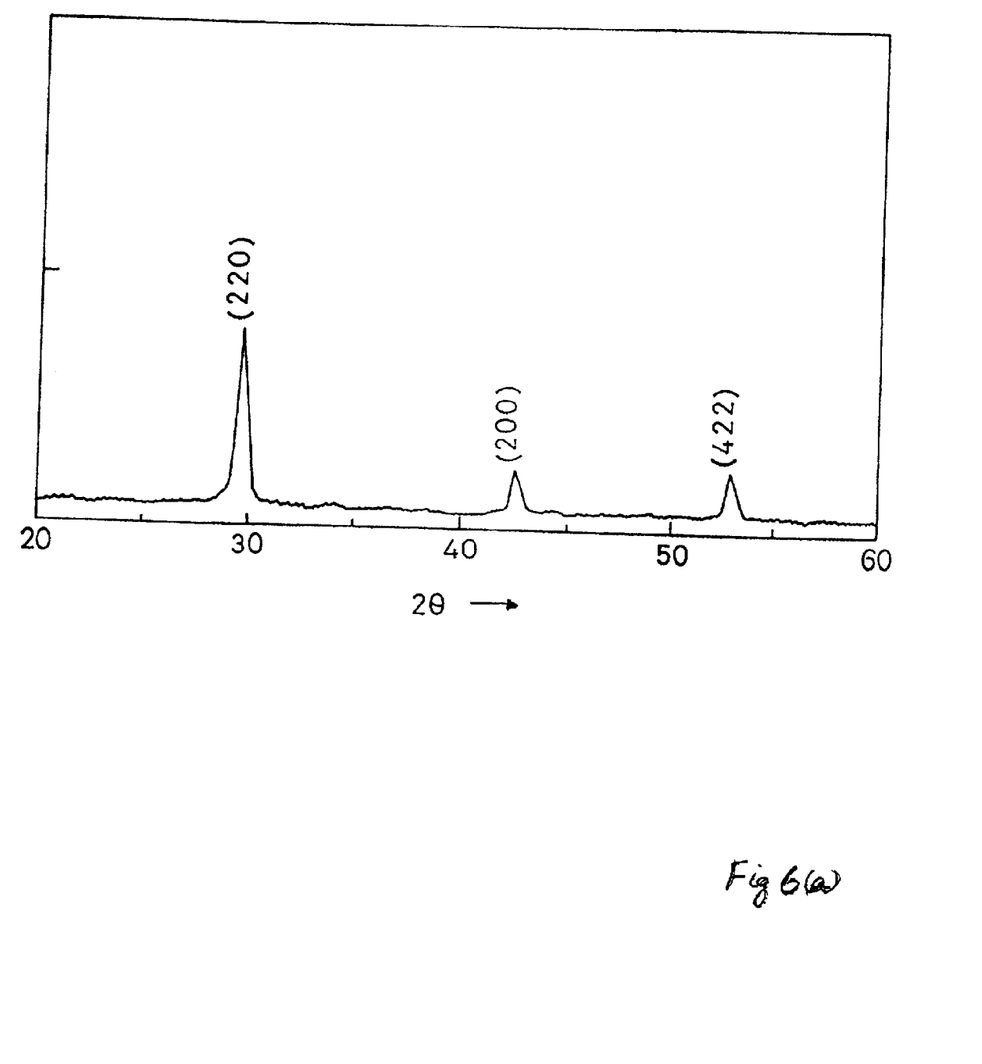
FIG. 6(a) gives the X-ray diffraction pattern for the precursor $YBa_2ZrO_3$ showing that the powder is phase pure.
Figure 6B:
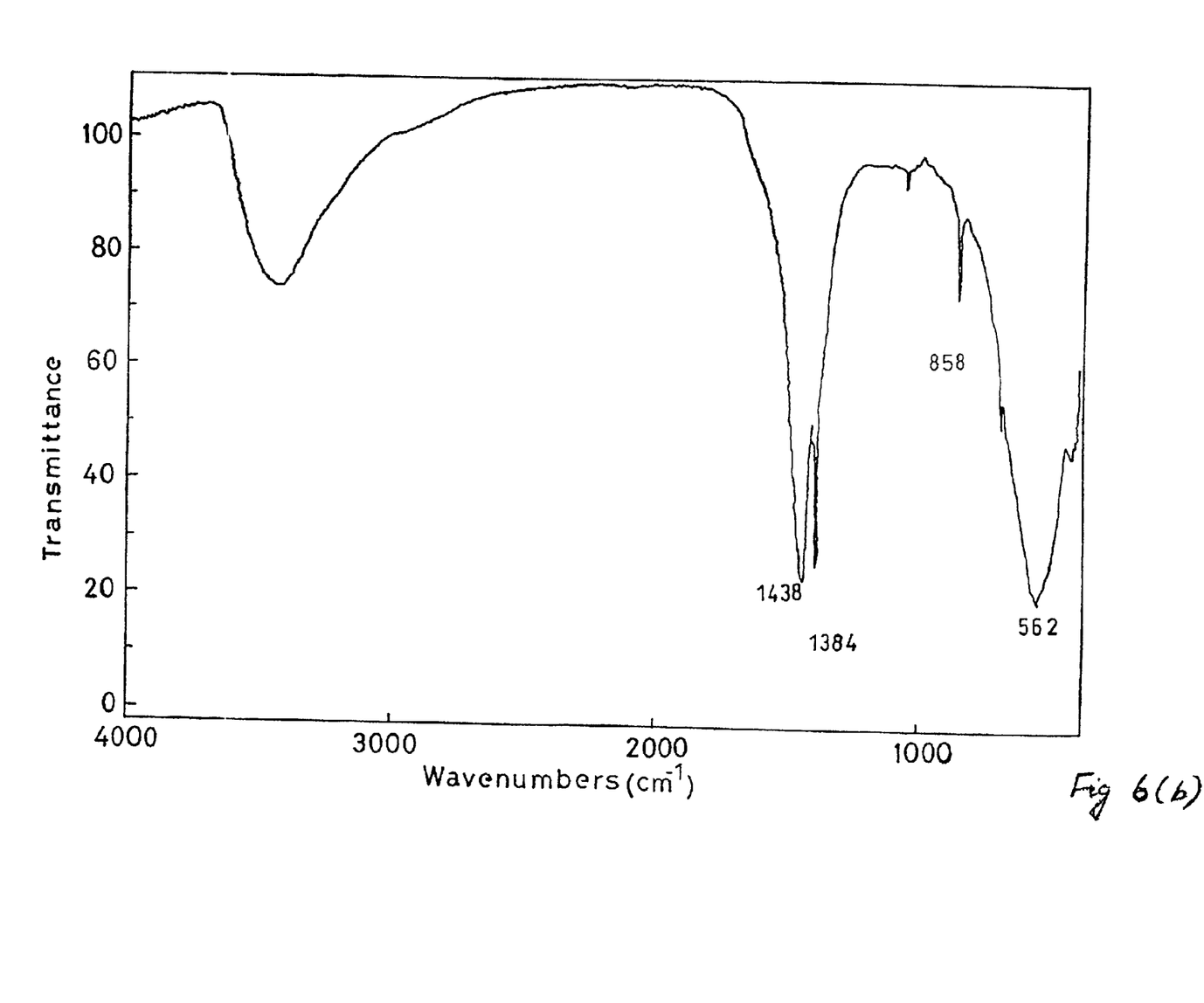
FIG. 6(b) is the corresponding FT-IR spectrum for the precursor $YBa_2ZrO_3$ showing that combustion is complete and that no organic matter is present in the system.

The X-ray diffraction patterns of the precursor is given in FIG. 6(a) which confirms that the powder obtained is phase pure. The FT-IR spectrum shown in FIG. 6(b) confirms that the combustion is complete and no organic matter is present in the system. The TEM examination of the powder give the particle sizes in the range of 50–400 nm. The particle size analysis of the samples has shown that more than 55% of the particle/agglomerates have size less than 800 nm which corroborates the TEM results.

EXAMPLE 7

Synthesis of Ultrafine LaBaSrZrO$_{5.5}$

The starting materials were analytical grade La$_2$O$_3$ (2.528 g), BaCO$_3$ (1.711 g), ZrCO$_3$ (0.9062 g) and ZrOCl$_{2.8}$H$_2$O (1.97 g). Because of the poor solubility of La$_2$O$_3$ and BaCO$_3$ and SrCO$_3$ in water, they were dissolved in nitric acid and ZrOCl$_{2.8}$H$_2$O in water. To this an equivalent quantity of citric acid (4.729 g) was added and the ammonia/nitrate content was controlled by the addition of ammonium nitrate. The beaker containing the solution is heated in a hot plate. Initially the solution boils and undergoes dehydration followed by decomposition leading to smooth deflation with enormous swelling, producing a foam. The foam then ignites and the product of combustion is voluminous and fluffy ultrafine powder of LaBaSrZrO$_{5.5}$.

Figure 7A:
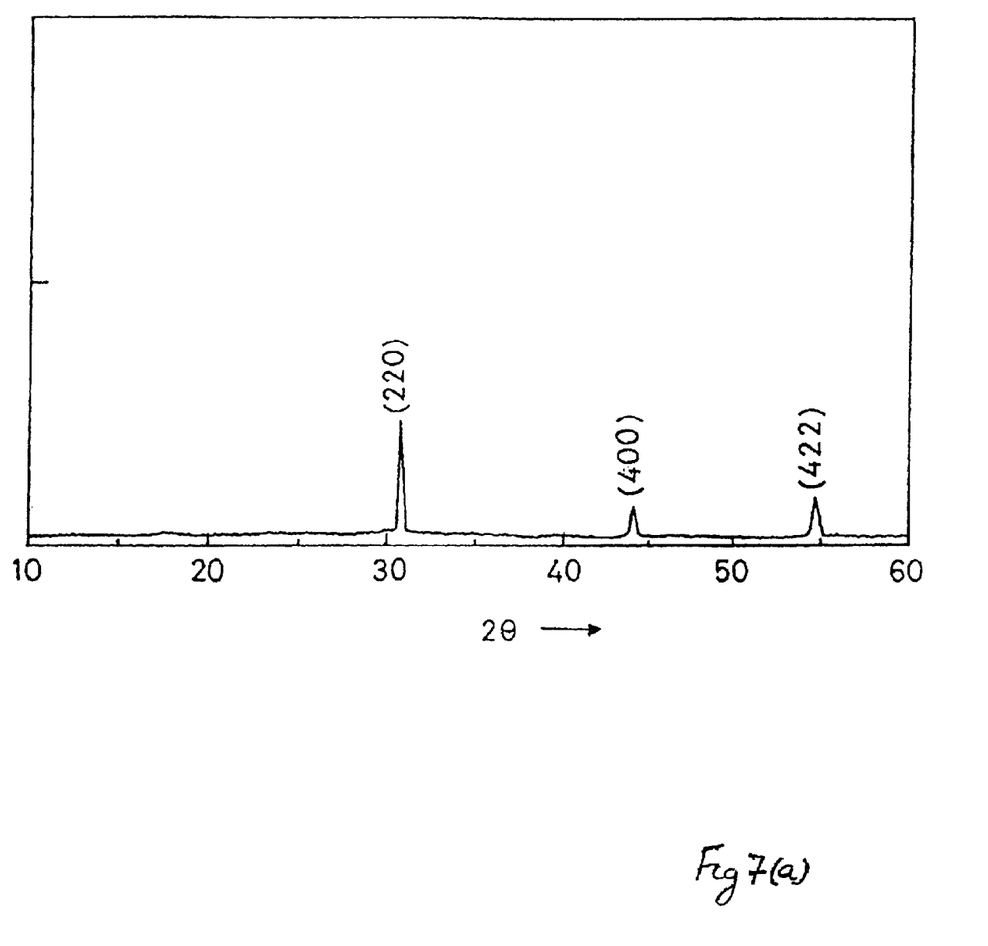
FIG. 7(a) is the X-ray diffraction pattern for the precursor $LaBaSrZrO_{5.5}$ showing that the powder is phase pure.
Figure 7B:
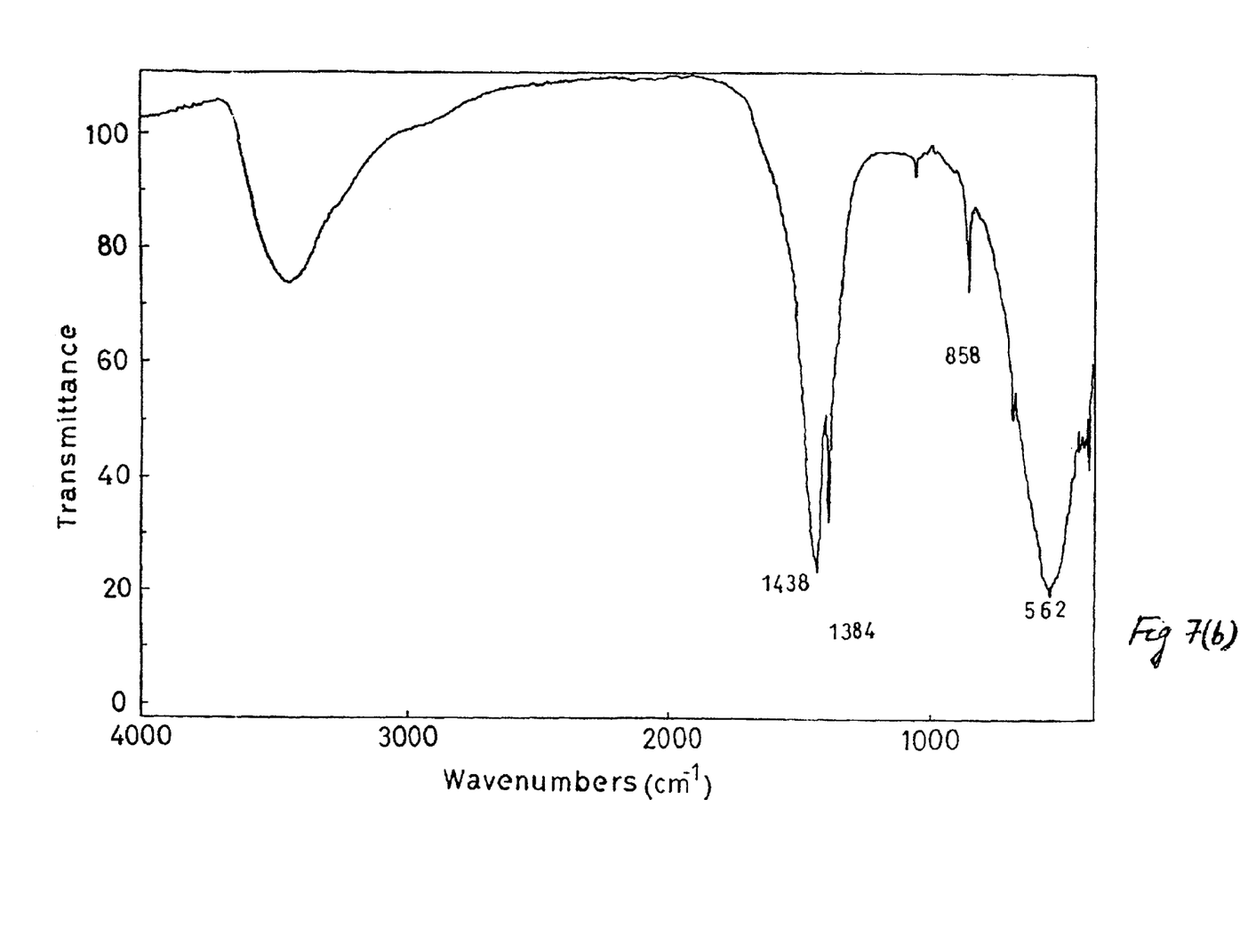
FIG. 7(b) gives the FT-IR spectrum for the precursor $LaBaSrZrO_{5.5}$ confirming that combustion is complete and that no organic matter is present in the system.

The X-ray diffraction patterns of the precursor is given in FIG. 7(a) which confirms that the powder obtained is phase pure. The FT-IR spectrum shown in FIG. 7(b) confirms that the combustion is complete and no organic matter is present in the system. The TEM examination of the powders give the particle sizes in the range of 50–400 nm. The particle size analysis of the samples has shown that about 50% of the particle/agglomerates have size less than 800 nm which corroborates the TEM results.

What is claimed is:

1. A process for synthesis of nanoparticles of phase pure ceramic oxides of a multi-component system comprising two or more metal ions, said process comprising:
   (a) preparing a solution containing the metal ions by dissolving their metal salts in an organic solvent or in water;
   (b) preparing a precursor by complexing the metal ions with a complexing agent while keeping the ratio of the charges of the complexing agent to the charges of the metal ions as unity wherein said precursor is formed in the solution;
   (c) adding nitric acid and ammonia; nitric acid and ammonium hydroxide; or ammonium nitrate to the solution to adjust the nitrate and ammonia content of the solution; and
   (d) heating the solution formed in step (c) from room temperature to 250–300° C. to produce a foam which subsequently ignites to provide a combustion product comprising the nanoparticles.

2. The process as claimed in claim 1 wherein the ceramic oxide produced contains two cations of the general formula ABO$_3$, wherein A is Si, Al, Y or Lanthanides, B is Ba, Sr, Ca, Mg or Fe; or with general formula AlM$_2$O$_5$, where M=Ti, Zr or Hf; or with general formula Al$_2$NO$_4$, where N=Mg, Ca, Sr, Ba, Zn; (b) three cations with the general formula A(B$_{0.5}$B'$_{0.5}$)O$_6$ or A$_2$(BB')O$_6$, where A is Ba, Sr, Ca or Mg, B is Zr, Hf, Sb or Sn, B' is Al, Y or Lanthanides, or (c) four cations with general formula (AA')(BB')O$_6$, where A and A' are B, Sr, Ca or Mg, B is Zr, Hf, Sb or Sn, B' is Al, Y or Lanthanides.

3. The process as claimed in claim 1 wherein the complexing agent is selected from the group consisting of citric acid, EDTA and oxalic acid.

4. The process as claimed in claim 1 wherein the metal salts are dissolved in an organic solvent and the nitrate and ammonia content in the solution is adjusted by addition of ammonium nitrate.

5. The process as claimed in claim 1 wherein the metal salts are dissolved in water and the nitrate and ammonia content in the solution is adjusted by the addition of nitric acid and ammonia or ammonium nitrate.

6. The process as claimed in claim 1 wherein the metal salts are selected from the group consisting of alkoxides, nitrate, chlorides, sulphates, oxychlorides or any other salts that are soluble in an organic solvent.

7. The process as claimed in claim 1 wherein the metal salts are water insoluble and are dissolved in suitable acids prior to step (a).

8. The process as claimed in claim 1 wherein the organic solvent is selected from the group comprising of alcohols, trichloroethylene, and any other solvents capable of dissolving the complexing agent and the metal salts.

9. The process as claimed in claim 8 wherein the alcohol is selected from the group consisting of ethyl alcohol, methyl alcohol and isopropyl alcohol.

10. The process as claimed in claim 1 wherein the heating is done on a sand bath or hot plate.

11. The process as claimed in claim 7 wherein the metal salts are oxides or carbonate salts.

\* \* \* \* \*